United States Patent [19]

Nakayama et al.

[11] Patent Number: 5,174,602
[45] Date of Patent: Dec. 29, 1992

[54] COVER FOR ACCOMMODATING AN AIR BAG

[75] Inventors: Yoshikazu Nakayama; Takayasu Zushi, both of Shiga, Japan

[73] Assignee: Takata Corporation, Tokyo, Japan

[21] Appl. No.: 688,453

[22] Filed: Apr. 22, 1991

[30] Foreign Application Priority Data

May 24, 1990 [JP] Japan ................................ 2-134684

[51] Int. Cl.⁵ ............................................. B60R 21/20
[52] U.S. Cl. ................................................... 280/743
[58] Field of Search ................ 280/728, 731, 732, 743

[56] References Cited

U.S. PATENT DOCUMENTS 4,903,986 2/1990 Cok et al. ............................ 280/743
5,060,971 10/1991 Nanbu et al. ........................ 280/728

FOREIGN PATENT DOCUMENTS 0363986 4/1990 European Pat. Off. .
3116538 11/1982 Fed. Rep. of Germany .
9001948 2/1990 Fed. Rep. of Germany .
0122753 5/1989 Japan ................................... 280/743
1-202550 8/1989 Japan .
0133266 5/1990 Japan ................................... 280/728
2171362 7/1990 Japan .

Primary Examiner—H. Grant Skaggs
Assistant Examiner—Carol Lynn Druzbick
Attorney, Agent, or Firm—Kanesaka and Takeuchi

[57] ABSTRACT

A cover for accommodating an air bag, which is provided at its inner surface with a tear line for starting tear at a start of an operation of the air bag. The tear line is extended up to edges of the cover.

5 Claims, 4 Drawing Sheets

FIG.6
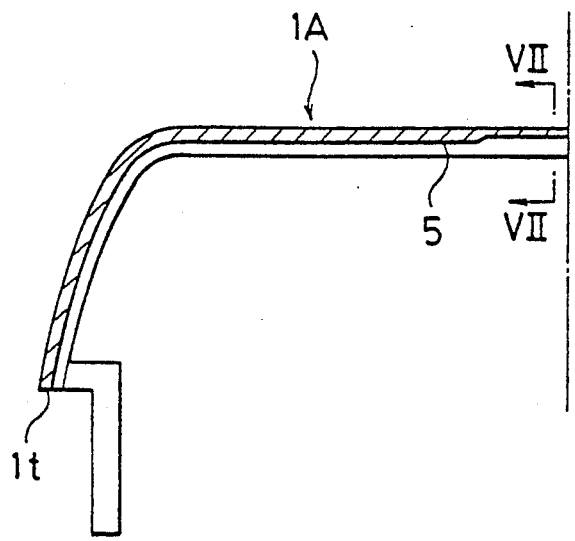
FIG.7
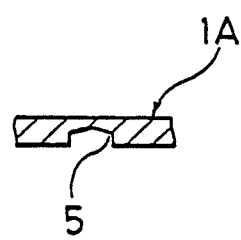
FIG.8
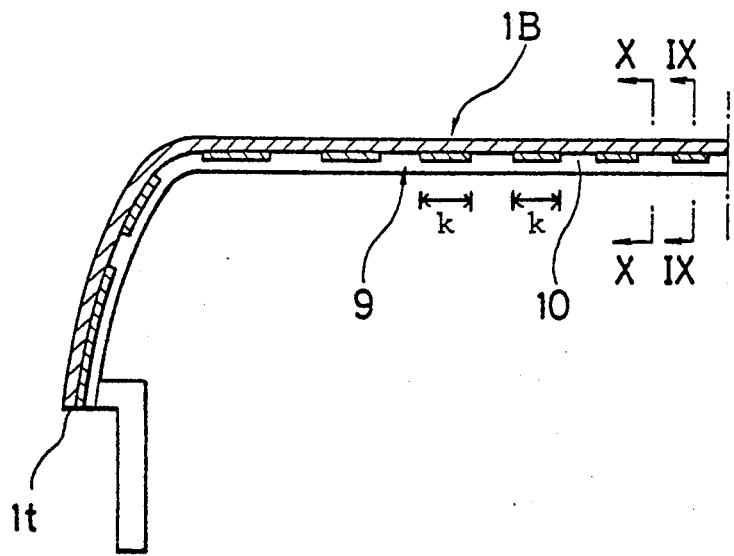
FIG.9
FIG.10
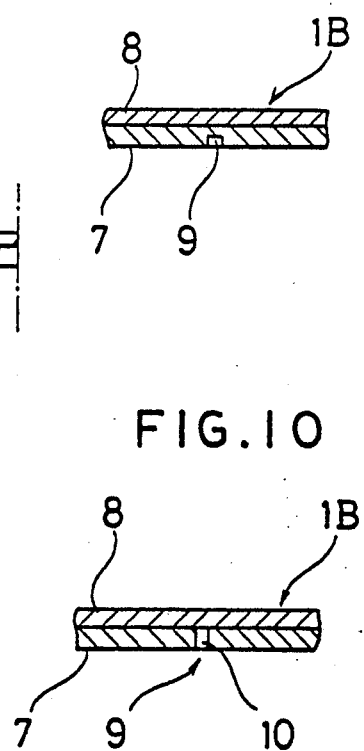

COVER FOR ACCOMMODATING AN AIR BAG

FIELD OF THE INVENTION AND RELATED ART STATEMENT

The present invention relates to a cover for accommodating an air bag which is adapted to be activated to inflate and develop by sensing an impact and/or deformation at a crash of a vehicle.

A prior art cover for accommodating an air bag is provided with a tear line at which a cover starts to tear along an intended line when the air bag is activated. This tear line is formed, for instance, of a continuous groove or intermittent grooves provided at the intended line to be torn. The groove may be provided with spaced portions having an increased depth. There has been a cover of a two-layer structure which has a hard layer and a soft layer, and is provided with a slit along the intended line to be torn in the hard layer.

In the prior art cover for accommodating the air bag, the tear line is provided only at portions except for edges of the cover. Therefore, this may reduce a range in which the cover can tear, and thus may restrict lateral development of the air bag with respect to a front of an occupant, so that various countermeasures are required, resulting in increase of cost.

OBJECT AND SUMMARY OF THE INVENTION

It is an object of the invention to provide a cover for accommodating an air bag in which tear extends up to an edge of the cover and a torn piece deforms in a lateral direction, when the air bag develops.

In a cover for accommodating an air bag according to the invention, which is provided at its inner surface with a tear line for starting tear at a start of an operation of the air bag, the tear line is extended up to an edge of the cover.

In the cover for accommodating the air bag of the invention, once the tear starts in the inner surface, the tear of the cover spreads along the tear line to the edge or end. Therefore, the cover deforms to a large extent, and thus the air bag can easily develop also in a lateral direction with respect to a front of an occupant.

BRIEF DESCRIPTION OF THE DRAWINGS

FIG. 6 is a cross section of a cover according to another embodiment of the invention;

FIG. 7 is a cross section taken along line VII—VII in FIG. 6;

FIG. 8 is a cross section according to still another embodiment of the invention;

FIGS. 9 and 10 are sectional views of a major part in FIG. 8; and

DESCRIPTION OF THE PREFERRED EMBODIMENTS

Embodiments will be described hereinafter with reference to the drawings.

Figure 1:
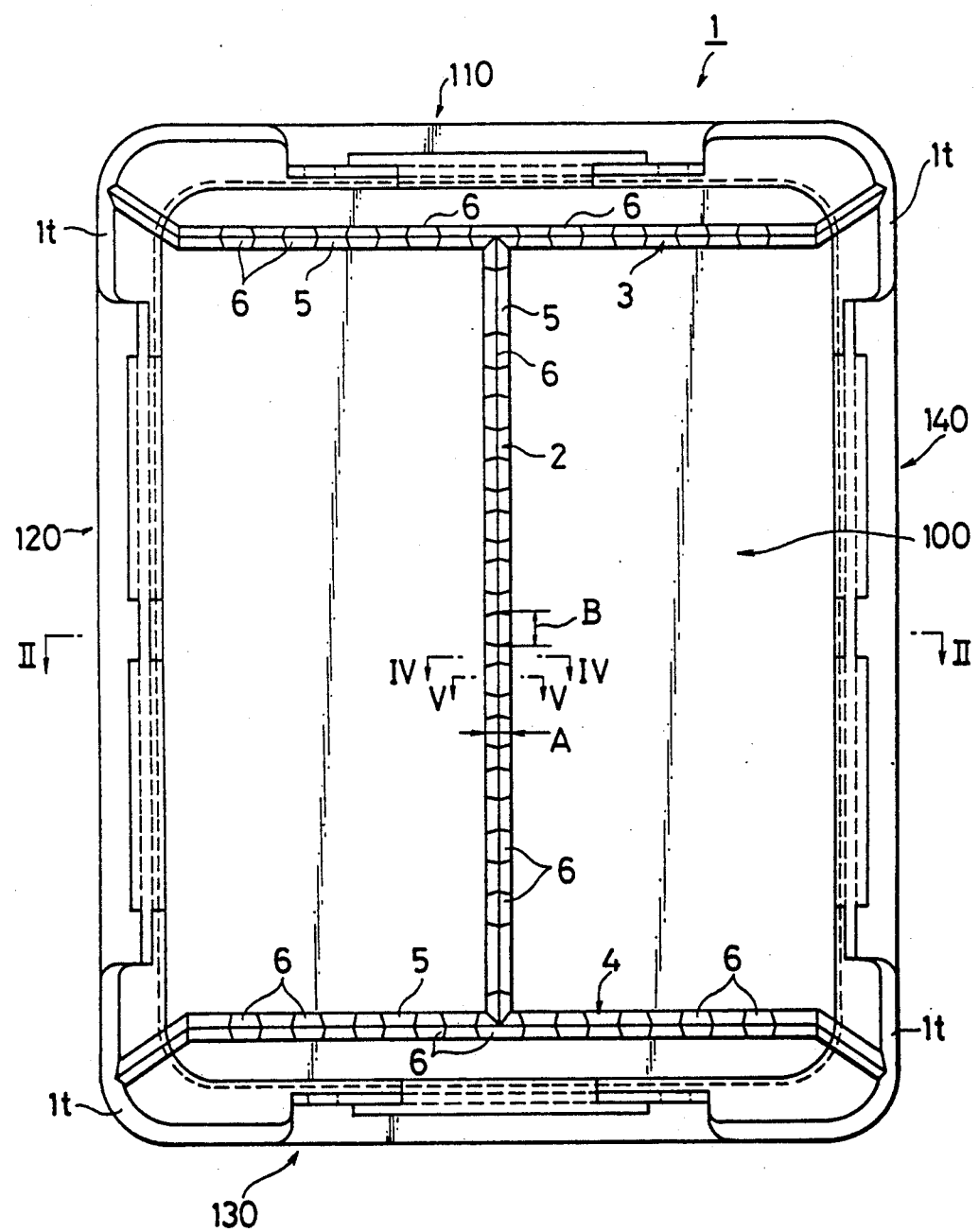
FIG. 1 is a bottom view of a cover according to an embodiment of the invention.
Figure 2:
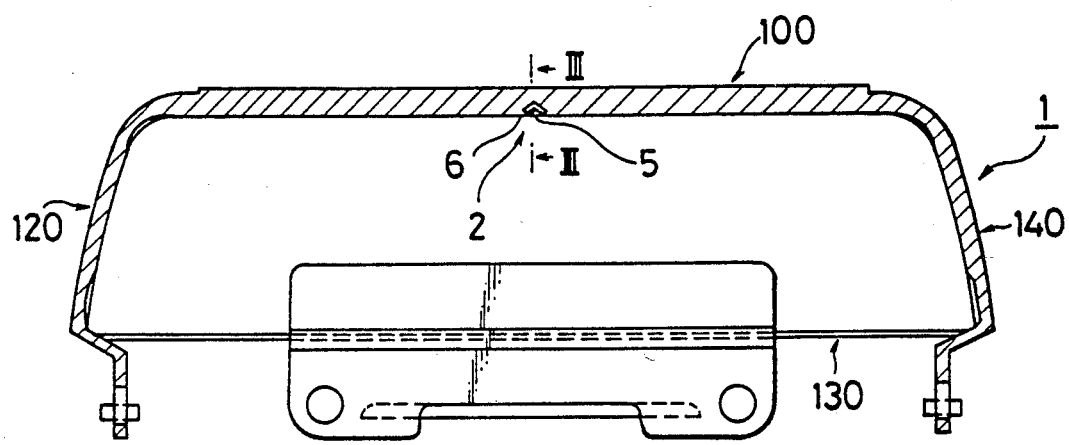
FIG. 2 is a cross section taken along line II—II in FIG. 1.
Figure 3:
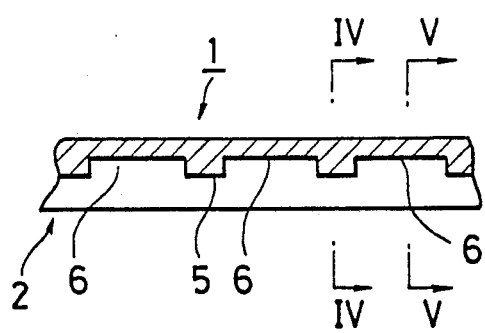
FIG. 3 is a cross section taken along line III—III in FIG. 2.
Figure 4:
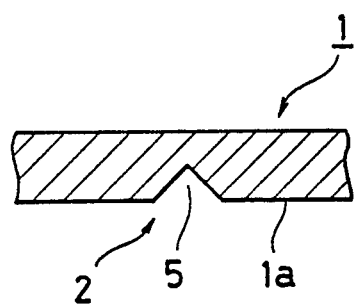
FIG. 4 is a cross section taken along line IV—IV in FIGS. 1 and 3.
Figure 5A:
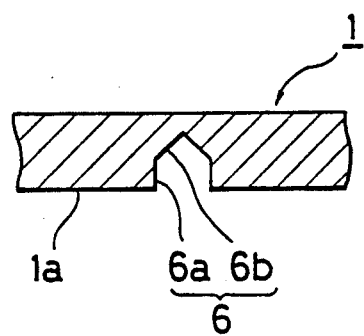
FIG. 5A is a sectional end view taken along line V—V in FIGS. 1 and 3.
Figure 5B:
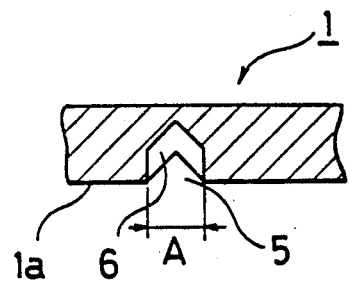
FIG. 5B is a sectional view taken along V—V in FIGS. 1 and 3.

FIG. 1 is a bottom view of a cover according to an embodiment of the invention, and FIG. 2 is a cross section taken along line II—II in FIG. 1. FIGS. 3, 4, 5A and 5B are enlarged sectional views illustrating major parts in FIG. 1. Specifically, FIG. 5A is a sectional end view and FIG. 5B is a sectional end view. Further, FIGS. 3, 4, 5A and 5B are enlarged views.

A cover 1 has a nearly oblong shape, and has a main plate portion 100 of a nearly oblong shape and four erected piece portions 110, 120, 130 and 140 erected from four sides of the main plate portion 100. The main plate portion 100 and the erected piece portions 110-140 are integrally formed of synthetic resin. This cover 1 is provided with a tear line formed as a central tear line 2 and end tear lines 3 and 4 for starting tear when an air bag is activated. The central tear line 2 extends through a central portion of the cover 1 in a lengthwise direction of the cover 1. The tear lines 3 and 4 extend in a widthwise direction of the cover 1 and are disposed near ends of the cover 1. The tear line 2 and the tear lines 3 and 4 are continuous to each other. These tear lines 3 and 5 are extended up to edges 1t.

These tear lines 2, 3 and 4 include a continuous groove 5 and concave portions 6 which are formed in the groove 5 and are spaced from each other. As shown in FIG. 4, the groove 5 has a triangular section. As shown in FIG. 5A, each concave portion 6 has side walls 6a perpendicular to a rear surface 1a of the cover 1 and inclined portions 6b which are formed at bottoms of these side walls 6a to form a triangular section, and thus has a pentagonal section. The concave portions 6 have hexagonal shapes in a bottom view of the cover 1, and each has two opposed apexes of the hexagon which are aligned along center lines of the tear lines 2, 3 and 4.

In a middle portion of the cover 1, the concave portions 6 are closely disposed in the central tear line 2 with reduced spaces therebetween. These spaces between the adjacent concave portions 6 increases, i.e., the density thereof decreases, as the positions move toward the tear lines 3 and 4 away from the middle portion.

In the tear lines 3 and 4, the distances between the adjacent concave portions 6 are substantially equal to each other. However, in a manner similar to the tear line 2, the distances between the adjacent concave portions 6 at the middle portions in the lengthwise direction of the tear lines 3 and 4 may be small and distances between the adjacent concave portions 6 may be increased as the positions move away from the middle portions.

For example, a material of the cover 1 of the invention is preferably, but not restricted to, thermoplastic polymer of JIS-K7203 having a bending elastic modulus of 1000 kg/cm$^2$ or more. Specifically, the material may be polyolefine contained soft material or thermoplastic elastomer containing olefine, styrene, polyester, polyurethane, vinyl chloride or polyamide. Rim-urethane including an inserted net is also preferable.

In the cover 1 thus constructed, when the inflating pressure of the air bag becomes active, the middle portion of the cover 1 having the minimum strength starts to tear. Once the tear starts in the middle portion, this tear rapidly spreads along the tear lines 2, 3 and 4 to the edges 1t. Since the tear spreads up to the edges 1t, torn pieces start to open to a large extent in the lateral direction of the cover 1, and the air bag will develop to a large extent in the lateral direction with respect to a front of an occupant.

In the illustrated embodiment, the apexes of the concave portions 6 are located on a center line of the groove 5, and thus the tear generated in the concave portions 6 is rapidly transmitted to portions of the groove 5 other than the concave portions 6. Since the groove 5 has the minimum thickness at its center line portion, the tear rapidly spreads along the center line of the groove 5.

In the above embodiment, the spaces between the concave portions 6 are reduced in the middle portion of the cover 1, so that the cover 1 may have the minimum strength at its middle portion. However, the minimum strength in the middle portion of the cover 1 may be achieved by increasing depths of the concave portions 6 in the middle portion.

FIG. 6 is a cross section of a cover 1A according to another embodiment of the invention, and FIG. 7 is a cross section taken along line VII—VII in FIG. 6. In this embodiment, there is provided a tear line formed of a continuous groove 5. This tear line is extended up to the edges 1t of the cover 1A. This groove 5 has a maximum depth at the middle portion of the cover 1A and a relatively small depth at portions near the ends. In this embodiment, the groove 5 has a pentagonal section and the tear will propagate along the center line of the groove 5.

FIG. 8B is a cross section of a cover 1B according to still another embodiment of the invention. FIGS. 9 and 10 are cross sections taken along line IX—IX and X—X in FIG. 8. The cover 1B according to this embodiment has a two-layer structure including a stack of a hard layer 7 and a soft layer 8. A tear line 9 is provided in the hard layer 7. This tear line 9 is formed of a groove and slits, and includes the intermittent slits 10 which are spaced from each other and are extended to the soft layer 8. The slits 10 may be shallow without reaching the soft layer 8. Spaces k between the adjacent slits 10 are small in the middle portion of the cover 1B, and are increased as the positions move toward the ends.

Figure 11:
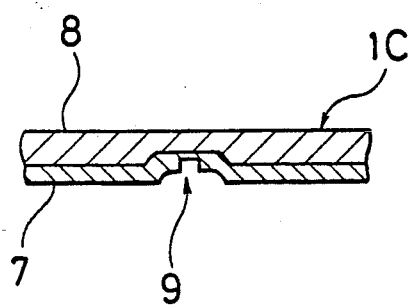
FIGS. 11 and 12 are cross sections illustrating yet another embodiment of the invention.
Figure 12:
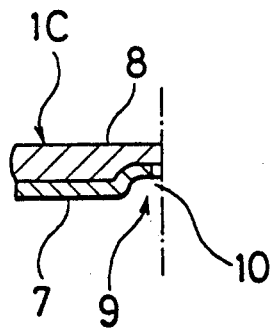

In the embodiments shown in FIG. 8, 9 and 10, an entire thickness of the cover 1 is constant. As shown in FIGS. 11 and 12, a cover 1C may have a reduced thickness at an area near a tear line 9. FIG. 11 is a cross section of a portion corresponding to FIG. 9, and FIG. 12 is a cross section of a portion corresponding to FIG. 10. The covers 1B and 1C shown in FIGS. 8-12 also have tear lines extending up to the cover edges 1t.

The covers shown in FIGS. 8-12 may be easily fabricated, for instance, by a double injection molding.

According to the cover for accommodating the air bag of the invention, as also apparent from the embodiments described hereinabove, the tear is extended up to the cover edges when the air bag develops, so that the torn pieces largely deform in the lateral direction. Therefore, the air bag can rapidly and largely develop in the lateral direction with respect to the front of the occupant. Accordingly, constraint and protection performance for a user at the crash of the vehicle is remarkably improved.

What is claimed is:

1. A cover for accommodating and covering an air bag in an air bag device, comprising:
    a main plate portion in a form of a rectangular shape and having an inner surface, a middle portion and four sides,
    four erected piece portions extending in a direction to partly cover the air bag from the four sides of the main plate portion, respectively, said erected piece portions having inner surfaces and outer edges, and
    a tear line provided at the inner surfaces of the main plate portion and the erected piece portions for tearing the cover, said tear line including a central tear line extending in the middle portion of the main plate portion and terminating near the sides thereof, and two end tear lines extending perpendicular to and continuous from the central tear line, each end tear line extending along the side of the main plate portion and the two erected piece portions all the way to the outer edges thereof so that when the air bag is inflated, the main plate portion and the two erected piece portions are torn along the tear line to allow the cover to deform entirely.

2. A cover of claim 1, wherein said tear line is formed of a continuously extended groove.

3. A cover of claim 1, wherein said groove comprises a continuously extended groove and spaced concave portions provided in said groove.

4. A cover of claim 1, wherein said end tear lines are formed in the erected piece portions extending parallel to the central tear line.

5. A cover of claim 4, wherein said end tear lines extend in the erected piece portions along side portions thereof.

* * * * *